(12) United States Patent
Breese

(10) Patent No.: US 6,547,270 B1
(45) Date of Patent: Apr. 15, 2003

(54) FIFTH WHEEL KINGPIN RETAINING BAR

(76) Inventor: Ralph L. Breese, 5504 Pioneer Cir., Norman, OK (US) 73072

( * ) Notice: Subject to any disclaimer, the term of this patent is extended or adjusted under 35 U.S.C. 154(b) by 0 days.

(21) Appl. No.: 10/058,195

(22) Filed: Jan. 29, 2002

(51) Int. Cl.⁷ .............................................. B62D 53/10
(52) U.S. Cl. ..................................... 280/432; 280/433
(58) Field of Search ................................. 280/432, 433, 280/434, 435, 436, 437, 438.1, 441.1

(56) References Cited

U.S. PATENT DOCUMENTS

| | | | |
|---|---|---|---|
| 2,772,895 A | * 12/1956 | Steeves et al. | ............... 280/432 |
| 3,352,571 A | * 11/1967 | Nelson | ........................ 280/435 |
| 3,830,523 A | * 8/1974 | Morichetto | .................. 280/434 |
| 5,013,060 A | 5/1991 | Van Andel | |
| 5,529,329 A | 6/1996 | McCoy | |
| 5,839,745 A | 11/1998 | Cattau | |
| 6,170,850 B1 | 1/2001 | Works | |
| 6,179,316 B1 | 1/2001 | Sibley, Jr. | |

FOREIGN PATENT DOCUMENTS

EP  544268 A1  * 6/1993  ........... B62D/53/12

* cited by examiner

*Primary Examiner*—Kevin Hurley
(74) *Attorney, Agent, or Firm*—Randal D. Homburg

(57) ABSTRACT

The invention is an improvement to a existing fifth wheel hitch mounted within the bed of a pickup, the improvement applied to the existing fifth wheel hitch either before or after installation to a towing vehicle, providing for secondary retainment of a fifth wheel trailer kingpin within the fifth wheel hitch in the event that accidental or inadvertent disengagement of the kingpin from the hitch occurs during transport, release or connection of the fifth wheel trailer to the fifth wheel hitch preventing injury to person or damage to the towing vehicle, the fifth wheel hitch and the fifth wheel trailer.

3 Claims, 4 Drawing Sheets

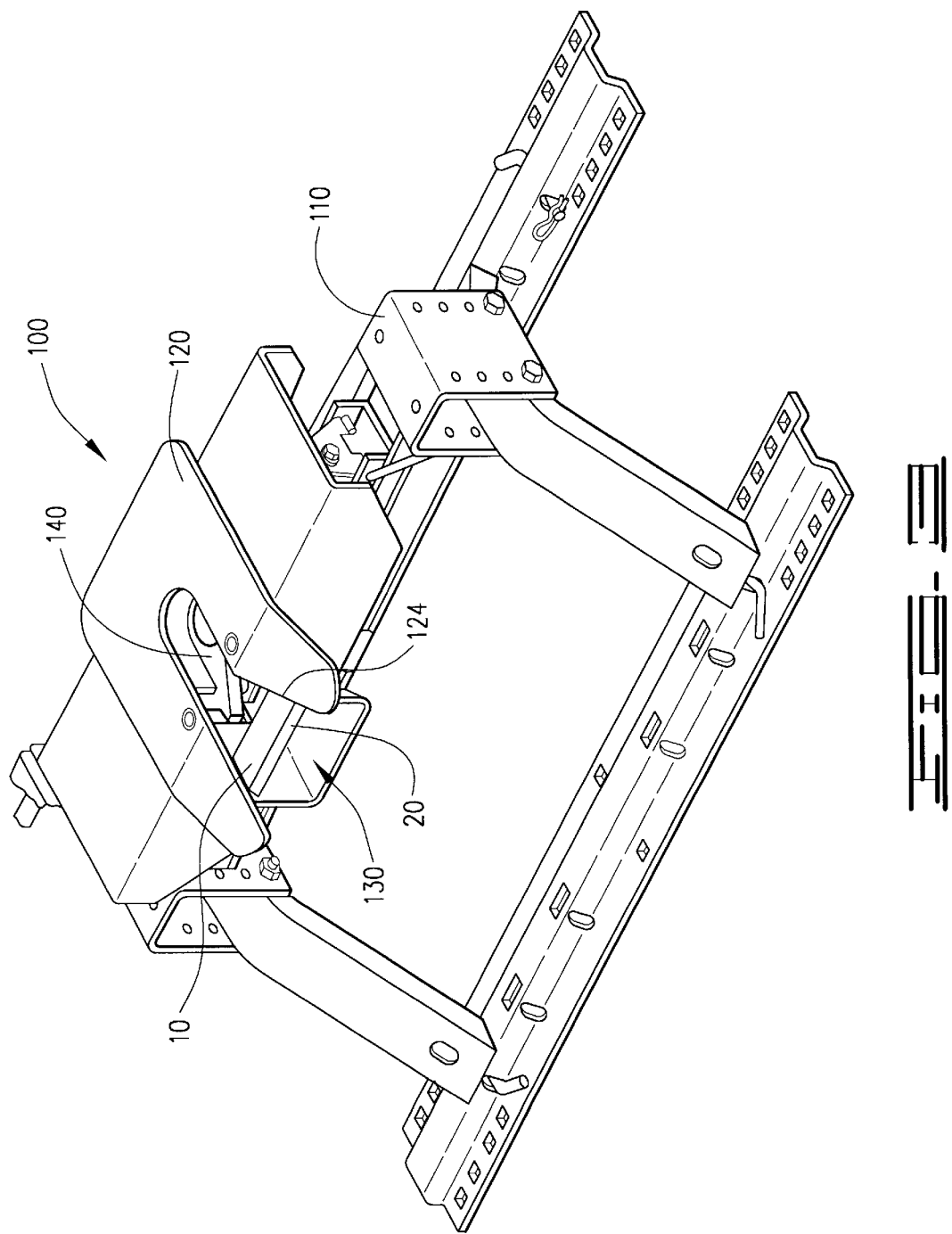

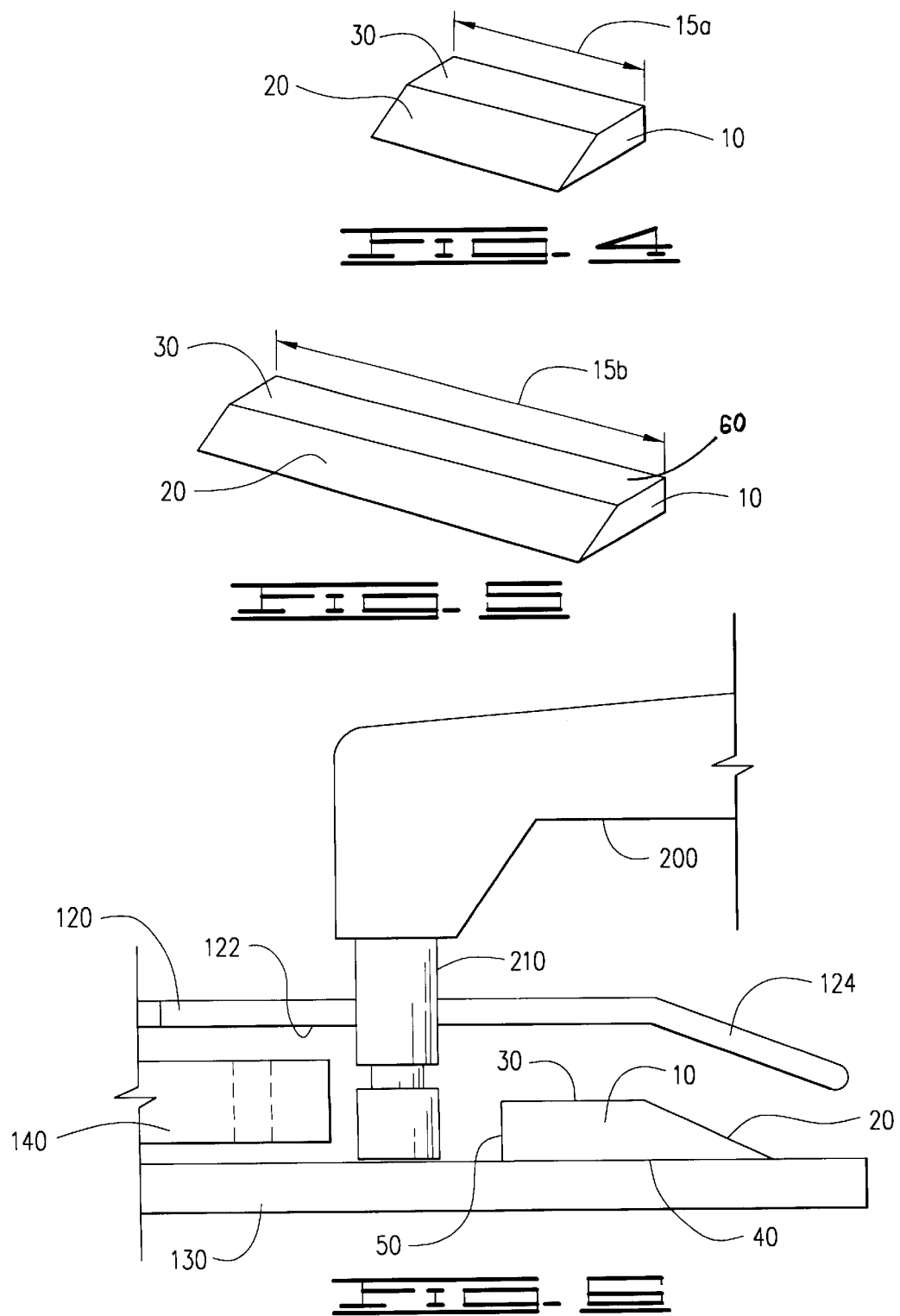

FIFTH WHEEL KINGPIN RETAINING BAR

CROSS REFERENCE TO RELATED APPLICATIONS

None

I. BACKGROUND OF THE INVENTION

1. Field of Invention

The invention is an improvement to a existing fifth wheel hitch mounted within the bed of a pickup, the improvement applied to the existing fifth wheel hitch either before or after installation to a towing vehicle, providing for secondary retainment of a fifth wheel trailer kingpin within the fifth wheel hitch in the event that accidental or inadvertent disengagement of the kingpin from the hitch occurs during transport, release or connection of the fifth wheel trailer to the fifth wheel hitch preventing injury to person or damage to the towing vehicle, the fifth wheel hitch and the fifth wheel trailer.

2. Description of Prior Art

The following United States patents were discovered and are disclosed within this application for utility patent. All relate to fifth wheel hitches and fifth wheel safety devices.

Three patents depict fifth wheel hitches to which the invention may be attached. See U.S. Pat. Nos. 6,179,316 to Sibley, U.S. Pat. No. 6,170,850 to Works and U.S. Pat. No. 5,839,745 to Cattau. All three of these hitches, showing prior art fifth wheel hitches, have an upper plate, a lower plate and a flared mouth leading into the upper plate. The fifth wheel trailer kingpin is placed within the flared mouth of the upper plate, riding above the lower plate, such kingpin held within the hitch by locking jaws or locking hooks.

The current invention is a device attached within the flared mouth above the lower plate and below the upper plate in front of the locking jaw, the device providing a flat elongated metal plate having an angled front edge positioned to apply the angled front edge tapering upward from the lower plate from the front of the tapered mouth towards the locking jaws. The metal plate also includes a flat upper surface and a vertical flat rear edge, the rear edge catching the kingpin should the kingpin become released from the locking jaw, preventing the escape of the kingpin from the flared mouth of the fifth wheel hitch without a forced raising of the fifth wheel trailer to a height above the vertical backplate. This retention within the flared mouth of the kingpin prevents any lateral movement of the kingpin which held by the vertical back plate of the device and also held laterally by the flared opening of the upper plate. The kingpin may ride over the ramp as the kingpin is engaged, but will not be removed from the backplate without applied upward force to the fifth wheel kingpin, provided the front of the fifth wheel trailer is properly weighted towards the front of the fifth wheel trailer.

U.S. Pat. No. 5,013,060 to Van Andel discloses a platform mounted to the bed of a pickup which includes three channels, one front and two side channels surrounding a restraining plate which catches a kingpin which escapes the confines of the fifth wheel hitch due to accident or human error preventing damage to the bed and side rails of the towing vehicle. This device attaches to the base frame of the fifth wheel hitch and rides below the bottom plate of the fifth wheel hitch. It does not retain the kingpin within the flared mouth of the upper plate, positioning the kingpin for reattachment. Van Andel'060 also does not confine the kingpin in a lateral dimension, which allows the towed fifth wheel trailer to move and sway laterally, increasing the potential of a "jack-knife" or loss of control of the towed vehicle.

II. SUMMARY OF THE INVENTION

The primary objective of the invention is to provide a secondary safety device for fifth wheel trailer hitches to serve as a temporary and secondary means of retaining a kingpin within a flared mouth of an upper plate of the fifth wheel hitch in the event that an accidental release of the kingpin occurs during movement or transport, protecting the pickup, the fifth wheel hitch and the fifth wheel trailer from damage.

A secondary objective is to provide the device in an embodiment which may be readily applied to the fifth wheel hitch either prior to or after installation of the fifth wheel hitch within the bed of a pickup without the need to modify or alter the fifth wheel hitch or the kingpin of the fifth wheel trailer, with the exception of the addition of the device.

A third objective of the invention is to cause the kingpin retained in the device to be kept in a position within the upper plate of the fifth wheel hitch to position the kingpin for ready and proper reattachment to the fifth wheel hitch.

III. DESCRIPTION OF THR DRAWINGS

The following drawings are submitted with this utility patent application.

FIG. 3 is a front perspective view of a fifth wheel hitch with the device attached to the underside of the upper plate within the flared mouth.

FIG. 4 is a perspective view of the first embodiment of the device.

FIG. 5 is a perspective view of the second embodiment of the device.

FIG. 6 is a side view of the first embodiment of the device in relation to the kingpin.

Index of Reference Numbers

| | | | | | |
|---|---|---|---|---|---|
| 10 | metal plate | 100 | fifth wheel hitch | 200 | fifth wheel trailer |
| 15a | first width | 110 | mounting base | | |
| 15b | second width | 120 | upper plate | 210 | kingpin |
| 20 | angled front edge | 122 | underside | | |
| 30 | upper surface | 124 | flared mouth | | |
| 40 | lower surface | 126 | width | | |
| 50 | rear edge | 130 | lower plate | | |
| 60 | extending ends | 140 | locking jaw | | |

IV. DESCRIPTION OF THE PREFERRED EMBODIMENT

Figure 1:
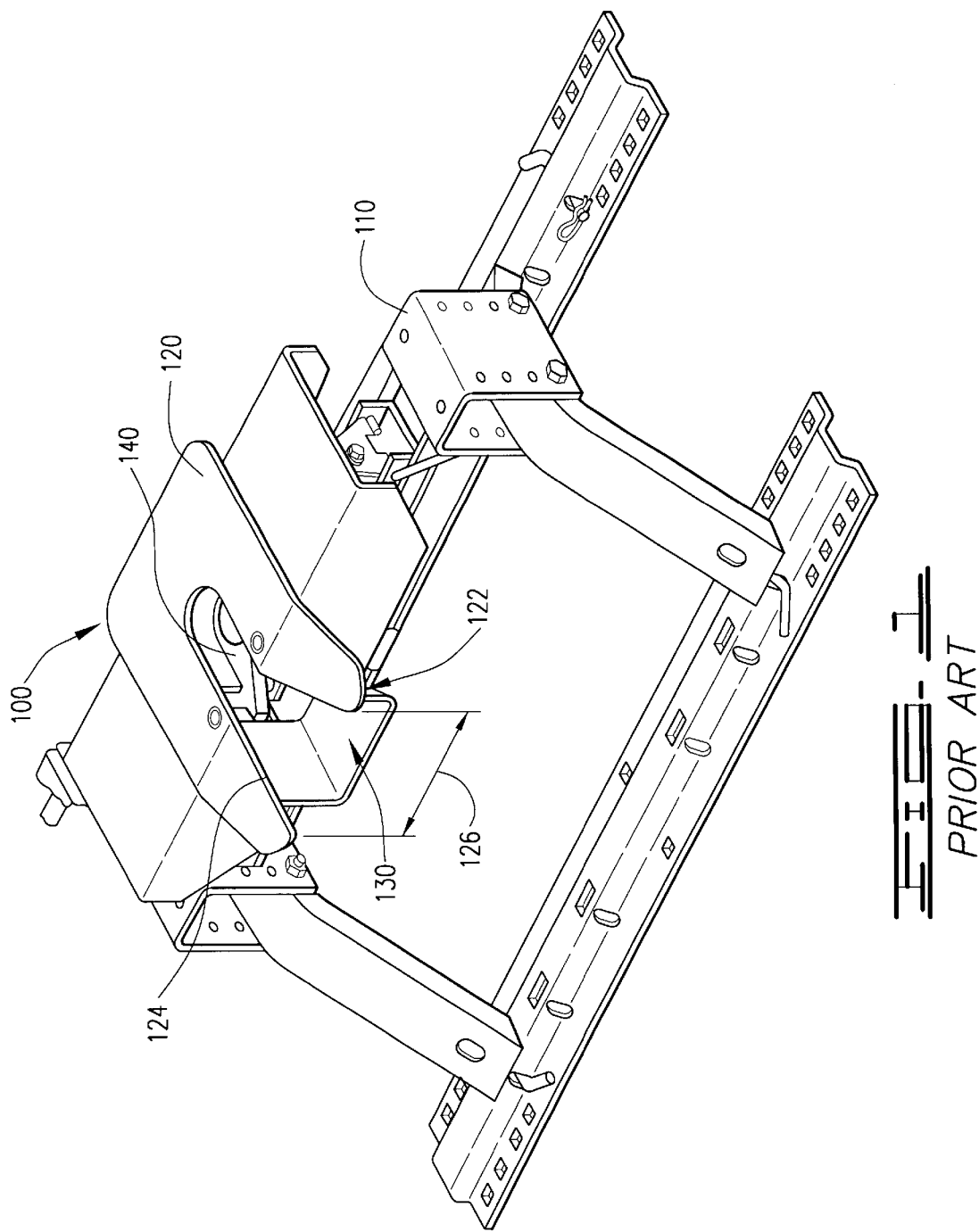
FIG. 1 is a view of prior art fifth wheel hitches to which the device is attached.

The invention is an improvement to a fifth wheel trailer hitch 100 mounting to a bed of a vehicle, the fifth wheel trailer hitch 100, as shown in FIG. 1 as prior art, having a mounting base 110 attaching the fifth wheel trailer hitch 100 to the bed of the vehicle, an upper plate 120, a lower plate 130, a flared mouth 124 having a width 126 within the upper plate 120, at least one locking jaw 140 between the upper plate 120 and the lower plate 130, retaining a kingpin 210 from a fifth wheel trailer 200 within the flared mouth 124 of the upper plate 120, the improvement comprising a horizontally oriented, transversely extending, rectangular metal plate 10 having an angled front edge 20, a flat upper surface 30, a flat lower surface 40 and a vertical flat rear edge 50.

Figure 2:
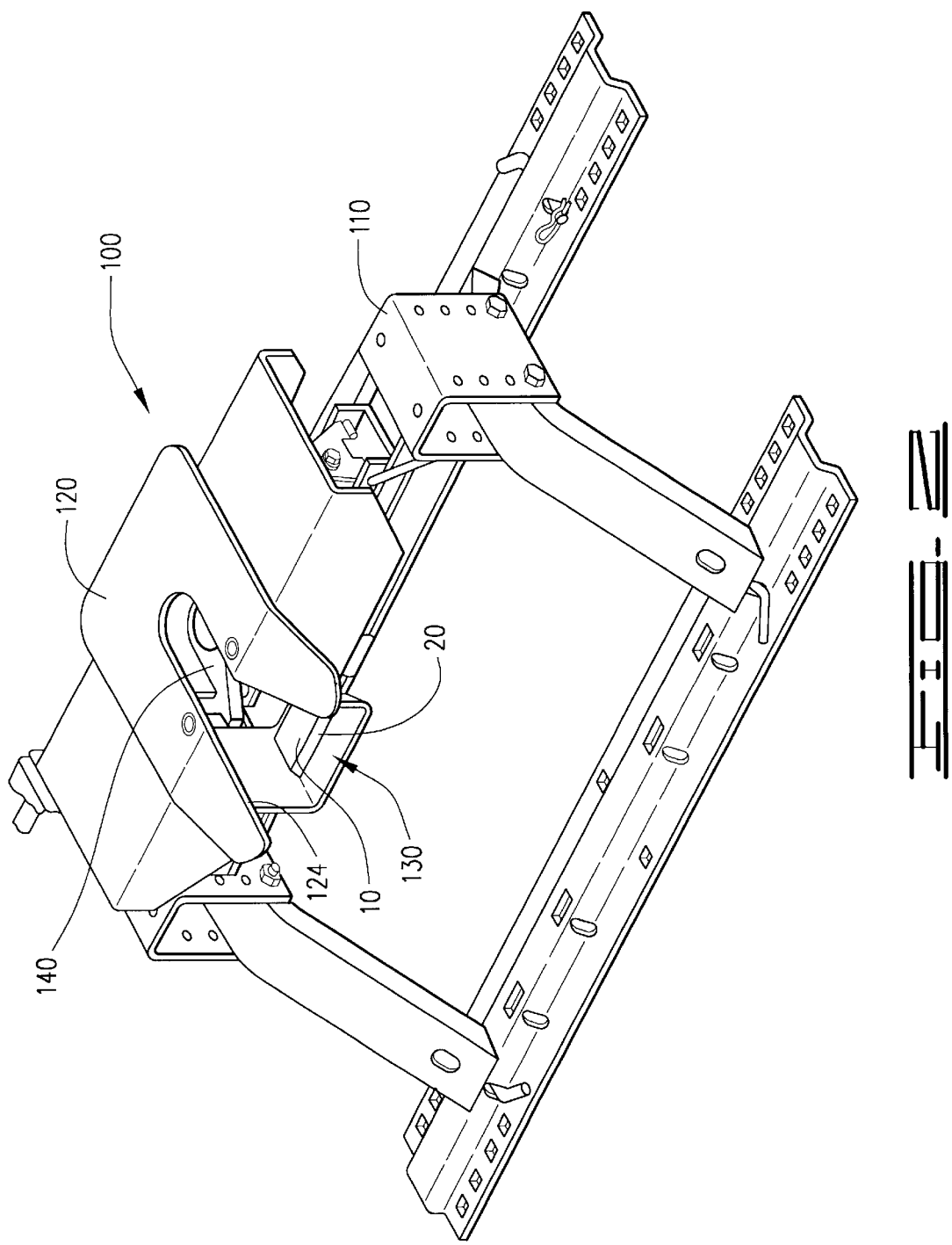
FIG. 2 is a front perspective view of a fifth wheel hitch with the device attached to the lower plate below the flared mouth of the upper plate of the fifth wheel hitch.

In a first embodiment, as shown in FIGS. 2 and 4 of the drawings, the metal plate 10 also includes a first width 15a which is the same dimension as the width 126 of the flared mouth 124 of the upper plate 120, the metal plate 10 attached to the fifth wheel hitch 100 by welding the lower surface 40 of the metal plate 10 to the lower plate 130 of the fifth wheel hitch 100 with the rear edge 50 towards the locking jaw 140.

In a second embodiment, as shown in FIGS. 3 and 5 of the drawings, the metal plate 10 has a second width 15b greater than the width 126 of the flared mouth 124, the metal plate 10 having extending ends 60 which are attached to an underside 122 of the upper plate 120 on the fifth wheel hitch 100 with the rear edge 50 towards the locking jaws 140.

Once the metal plate 10 is attached to the fifth wheel hitch 100, the fifth wheel trailer 200 may be attached to the fifth wheel hitch 100. The kingpin 210 will ride over the angled front edge 20 of the metal plate 10 as the kingpin 210 is inserted within the flared mouth 124 of the upper plate 120, across the flat upper surface 30, and drop behind the rear edge 50 as the kingpin 210 is directed into the locking jaw 140. However, the kingpin 210 cannot be removed from the flared mouth 124 once the kingpin 124 has dropped behind the rear edge 50 without applying an upward force to the kingpin 124, provided the fifth wheel trailer 200 is properly weighted towards the kingpin 210.

The rear edge 50 engages the kingpin 210 when the kingpin 210 is released from the locking jaw 140, preventing escape of the kingpin 210 from the flared mouth 124 of the fifth wheel hitch 100 without a forced raising of the kingpin 210 of the fifth wheel trailer 200 above the rear edge 50, as shown in FIG. 6 of the drawings. This retention of the kingpin 210 within the flared mouth 124 and the rear edge 50 of the metal plate 10 prevents any lateral movement of the kingpin 210.

While the invention has been particularly shown and described with reference to a preferred embodiment thereof, it will be understood by those skilled in the art that changes in form and detail may be made therein without departing from the spirit and scope of the invention.

What is claimed is:

1. An improvement to a fifth wheel trailer hitch mounting to a bed of a vehicle, the fifth wheel trailer hitch having a mounting base attaching the fifth wheel trailer hitch to the bed of the vehicle, an upper plate, a lower plate, a flared mouth having a width within the upper plate, at least one locking jaw between the upper plate and the lower plate retaining a kingpin from a fifth wheel trailer within the flared mouth of the upper plate, the improvement comprising:

a horizontally oriented, transversely extending, rectangular metal plate having a angled front edge, a flat upper surface, a flat lower surface, and a vertical flat rear edge wherein the lower surface is attached to the lower plate, causing the rear edge to retain the kingpin in the flared mouth unless an upward force is applied to the kingpin.

2. The improvement, as disclosed in claim 1, the improvement having a width which is equal to the width of the flared mouth of the upper plate, the improvement attached to the fifth wheel hitch by welding the lower surface of the improvement to the lower plate of the fifth wheel hitch with the rear edge towards the locking jaw.

3. The improvement, as disclosed in claim 1, the improvement having a width greater than the width of the flared mouth, the improvement also having extending ends attached to an underside of the upper plate on the fifth wheel hitch with the rear edge towards the locking jaws.

* * * * *